United States Patent
Hokazono et al.

(10) Patent No.: US 10,528,035 B2
(45) Date of Patent: Jan. 7, 2020

(54) NUMERICAL CONTROLLER

(71) Applicant: FANUC CORPORATION, Minamitsuru-gun, Yamanashi (JP)

(72) Inventors: Hiroki Hokazono, Yamanashi (JP); Takashi Satou, Yamanashi (JP); Takeshi Mochida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 322 days.

(21) Appl. No.: 15/386,759

(22) Filed: Dec. 21, 2016

(65) Prior Publication Data

US 2017/0185073 A1 Jun. 29, 2017

(30) Foreign Application Priority Data

Dec. 25, 2015 (JP) ................................ 2015-252890

(51) Int. Cl.
G06F 19/00 (2018.01)
G05B 19/416 (2006.01)
B30B 15/26 (2006.01)

(52) U.S. Cl.
CPC ............ *G05B 19/416* (2013.01); *B30B 15/26* (2013.01); *G05B 2219/37399* (2013.01)

(58) Field of Classification Search
CPC .. G05B 19/416; G05B 19/19; G05B 19/4069; G05B 19/4103; G05B 2219/35346;
(Continued)

(56) References Cited

U.S. PATENT DOCUMENTS 5,371,452 A 12/1994 Kato
6,291,959 B1 * 9/2001 Yoshida ............... G05B 19/404
318/567
(Continued)

FOREIGN PATENT DOCUMENTS

CN 103797430 A 5/2014
CN 105814503 A 7/2016
(Continued)

OTHER PUBLICATIONS

Notification of Reasons for Refusal for Japanese Application No. 2015-252890, dated Dec. 26, 2017 with translation, 4 pages.
(Continued)

*Primary Examiner* — Zhipeng Wang
(74) *Attorney, Agent, or Firm* — RatnerPrestia

(57) ABSTRACT

A numerical controller of the present invention includes a parameter setting unit which accepts settings of punch press parameters, an NC parameter calculating unit which calculates an axis control parameter in punch pressing based on the punch press parameters, a parameter storage unit which stores the punch press parameters and the axis control parameter, a command analyzing unit which analyzes a command block in the program to generate movement command data, an interpolating unit which generates interpolation data based on the movement command data, and an accelerating and decelerating unit which calculates a linear acceleration and deceleration time constant and a bell-shaped acceleration and deceleration time constant for use in axis control based on the punch press parameters, the axis control parameter, and a feed rate specified by the command block and performs post-interpolation acceleration or deceleration processing based on each of the calculated acceleration and deceleration time constants.

4 Claims, 12 Drawing Sheets

(58) Field of Classification Search
CPC .......... G05B 2219/36219; G05B 2219/36252;
G05B 2219/37399; G05B 2219/41436;
G05B 2219/42064; G05B 2219/45131;
B30B 15/26; Y02P 90/265
See application file for complete search history.

(56) References Cited

U.S. PATENT DOCUMENTS

| | | | |
|---|---|---|---|
| 2002/0045957 A1* | 4/2002 | Otsuki | G05B 19/416 700/63 |
| 2012/0296462 A1* | 11/2012 | Otsuki | G05B 19/4069 700/104 |
| 2014/0214193 A1 | 7/2014 | Tsuda et al. | |
| 2015/0205282 A1 | 7/2015 | Tezuka et al. | |
| 2016/0091886 A1* | 3/2016 | Sato | G05B 19/416 700/188 |
| 2016/0349732 A1 | 12/2016 | Kimata et al. | |

FOREIGN PATENT DOCUMENTS

| | | |
|---|---|---|
| JP | 4-335410 | 11/1992 |
| JP | 0916240 A | 1/1997 |
| JP | 1063339 A | 3/1998 |
| JP | 2001312309 A | 11/2001 |
| JP | 2015138450 A | 7/2015 |

OTHER PUBLICATIONS

Chinese Office Action for Chinese Application No. 201611206994.8, dated Mar. 7, 2019, with translation, 12 pages.

* cited by examiner

FIG.3
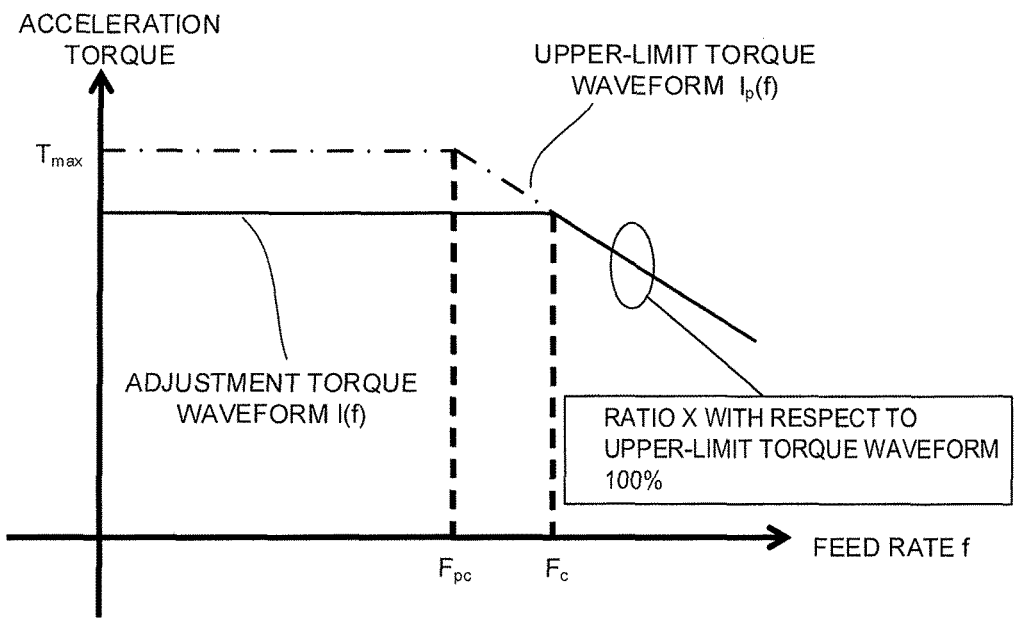
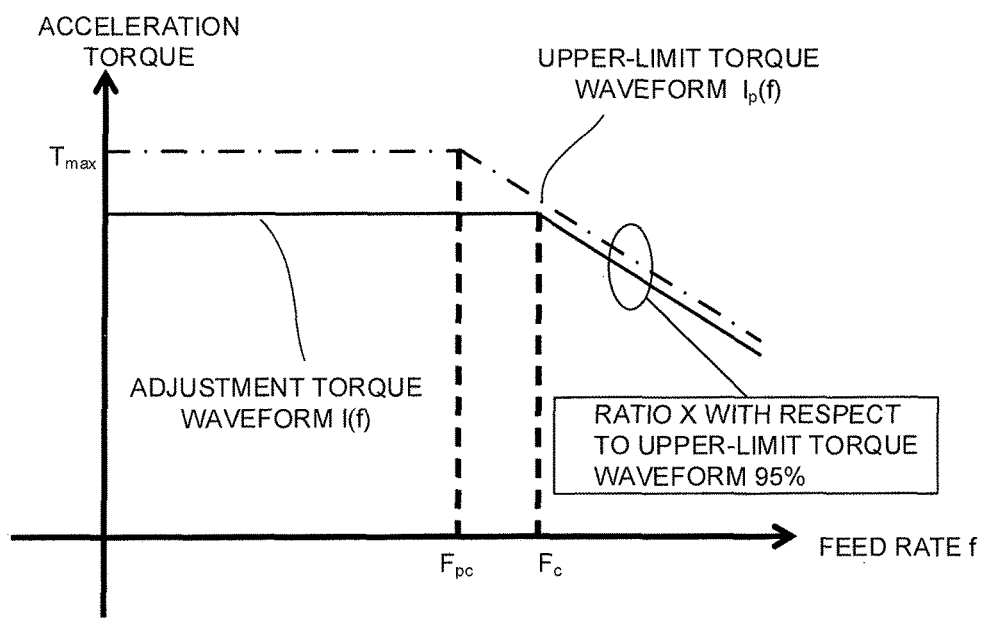

TABLE AXIS SPEED COMMAND

LINEAR ACCELERATION AND
DECELERATION TIME CONSTANT: $t_1$
COMMAND SPEED: F
MOVEMENT AMOUNT: d
POSITIONING TIME: t

TABLE AXIS SPEED COMMAND

LINEAR ACCELERATION AND
DECELERATION TIME CONSTANT: $t_1$
COMMAND SPEED: F
MOVEMENT AMOUNT: d
POSITIONING TIME: t

FIG.10
FEED RATE-TORQUE CHARACTERISTICS OF SERVO MOTOR
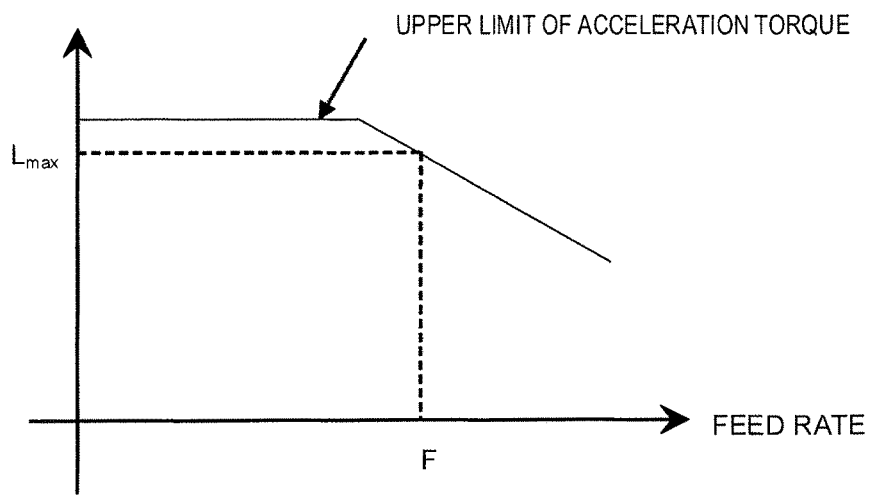
SETTING OF LINEAR ACCELERATION AND DECELERATION TIME CONSTANT T
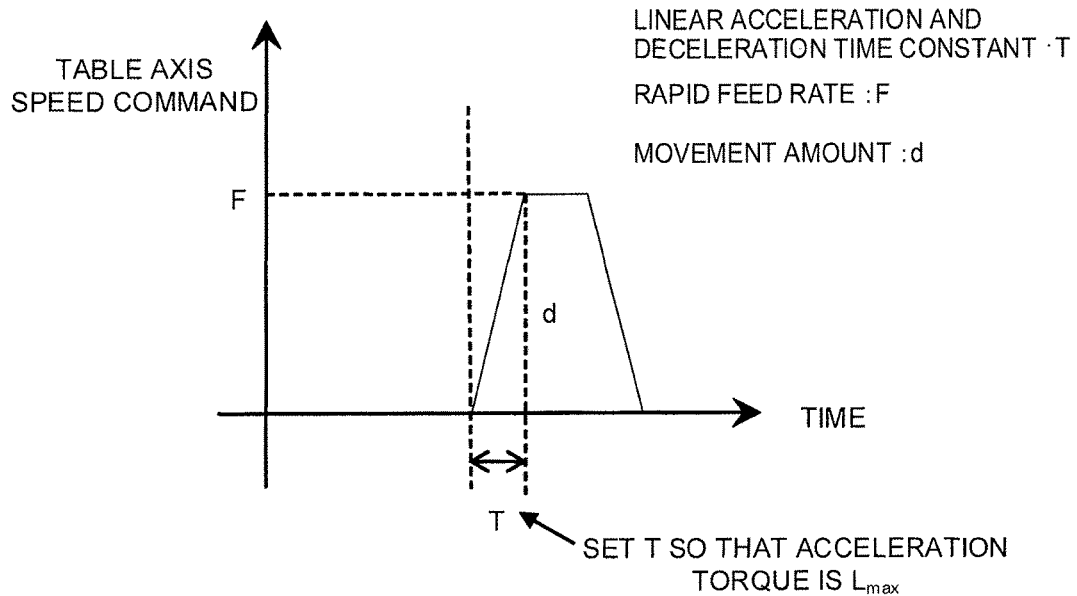
LINEAR ACCELERATION AND DECELERATION TIME CONSTANT : T
RAPID FEED RATE : F
MOVEMENT AMOUNT : d
SET T SO THAT ACCELERATION TORQUE IS $L_{max}$ FIG. 13
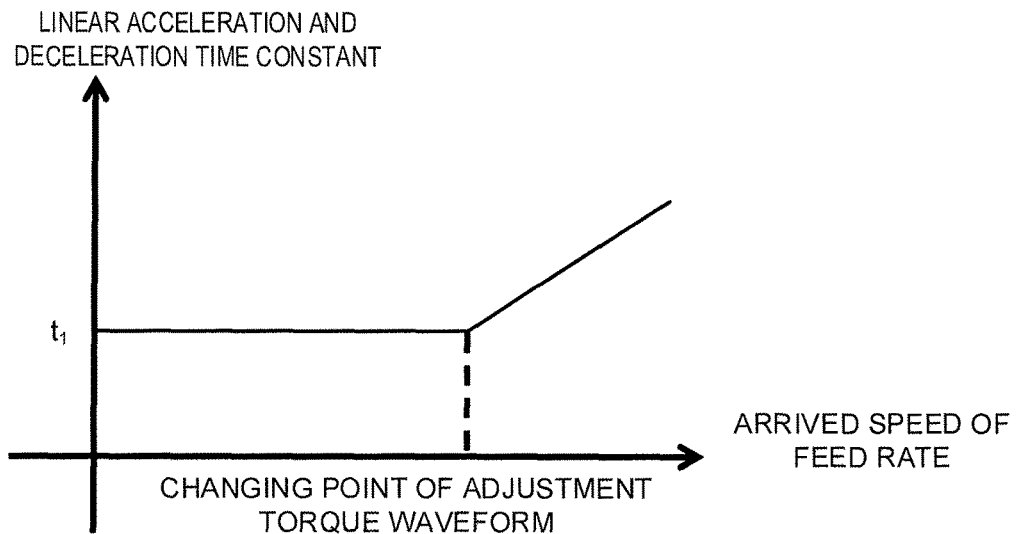
LINEAR ACCELERATION AND DECELERATION TIME CONSTANT CALCULATED BY NUMERICAL CONTROLLER OF PRESENT INVENTION
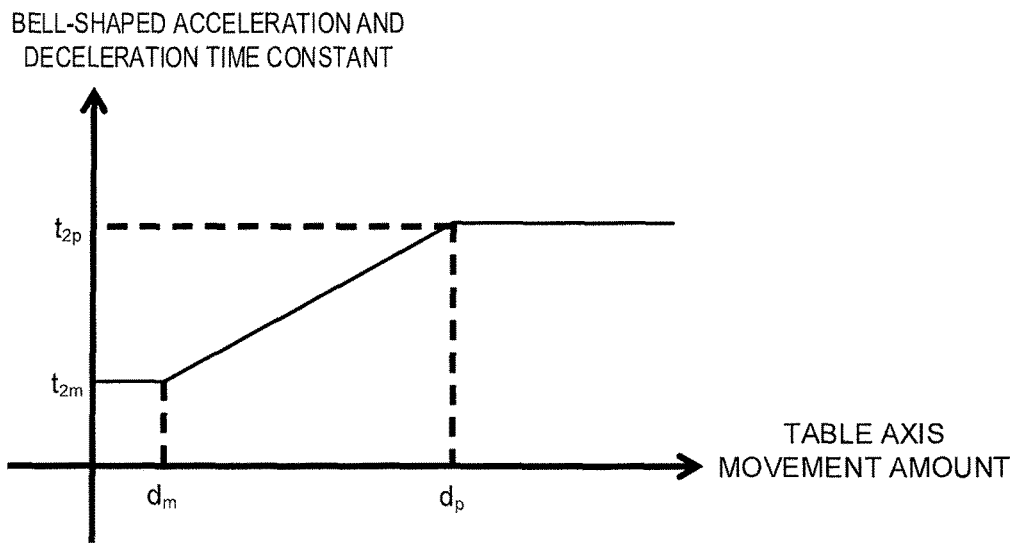
BELL-SHAPED ACCELERATION AND DECELERATION TIME CONSTANT CALCULATED BY NUMERICAL CONTROLLER OF PRESENT INVENTION

NUMERICAL CONTROLLER

BACKGROUND OF THE INVENTION

1. Field of the Invention

The present invention relates to numerical controller and, in particular, a numerical controller capable of easy settings of table axis operation of a punch press machine.

2. Description of the Related Art

In a punch press machine, to achieve a target hit rate (the number of times of press per minute), a function called "positioning with optimum acceleration" is provided in which speeds, acceleration and deceleration time constants, and position gains of a table axis are switched at seven stages in accordance with the movement amounts on the X axis and the Y axis (table axis). When this function is used, movement amounts as switching boundaries (hereinafter referred to as boundary values), and speeds, acceleration and deceleration time constants, and position gains are set for each of the X axis and the Y axis. In this setting, as depicted in FIG. 9, since many items including boundary values, and speeds, acceleration and deceleration time constants, and position gains have to be set for each of the X axis and the Y axis for seven stages, a problem arises in which setting is difficult and takes a long time.

Meanwhile, as a prior art technique for supporting setting of an acceleration and deceleration time constant for an axis to be controlled, Japanese Patent Application Laid-Open No. 4-335410 discloses a technique, as depicted in FIG. 10, in which an acceleration with the acceleration torque of which is the upper-limit $L_{max}$ of motor performance is found from a rapid feed rate F in a block with a movement amount d, feed rate-torque characteristics of a servo motor, and inertia of load; an acceleration and deceleration time constant T is found from the acceleration; and the largest time constant among all drive axes is set as a time constant for each axis.

In the punch press machine, press is adapted to be performed upon completion of the movement of a block. Here, a process failure occurs unless the servo motor is settled. In the technique disclosed in Japanese Patent Application Laid-Open No. 4-335410, the acceleration and deceleration time constant T is found from the acceleration with the acceleration torque of which is the upper-limit $L_{max}$ of motor performance. In the case of the punch press machine, when the axis movement is performed with high acceleration or deceleration, as depicted in FIG. 11, a problem may arise in which press timing has to be delayed due to, for example, occurrence of an overshoot when table axis movement is completed and the acceleration or deceleration set in accordance with the technique disclosed in Japanese Patent Application Laid-Open No. 4-335410 may not necessarily have an optimum value. Therefore, the technique disclosed in Japanese Patent Application Laid-Open No. 4-335410 cannot be simply applied to setting of an acceleration and deceleration time constant for the table axis of the punch press machine.

Moreover, when the function of "positioning with optimum acceleration" is used, if the table axis movement amount exceeds a boundary value, table axis acceleration is switched (acceleration is switched by switching the speed and the acceleration and deceleration time constant) and the position gain is also switched. This poses a problem, as depicted in FIG. 12, in which table axis operation (acceleration and position gain) may be significantly changed even with a slight difference in the movement amount upon transit through the boundary value.

SUMMARY OF THE INVENTION

Thus, an object of the present invention is to provide a numerical controller capable of easy settings of table axis operation of a punch press machine.

In the numerical controller of the present invention, in control of punch pressing, unlike the prior art technique of changing a linear acceleration and deceleration time constant in accordance with the axis movement amount, a linear acceleration and deceleration time constant $t_1$ dependent on a table axis arrived speed is automatically calculated from the structure of the machine and the characteristics of the servo motor. Also, in the punch press machine, an example of general evaluation criteria is a reference hit rate $h_p$ at the time of operation under the condition that a table axis movement amount is $d_p$ (25.4 (mm), 25.0 (mm), or the like) (this $d_p$ is set as a reference pitch). Also, a minimum movement amount (minimum pitch $d_m$) is set, and bell-shaped acceleration and deceleration time constants $t_{2p}$ and $t_{2m}$ are automatically calculated from a movable time calculated from a hit rate $h_m$ with the minimum movement amount, and t. FIG. 13 is a diagram depicting a linear acceleration and deceleration time constant and bell-shaped acceleration and deceleration time constants automatically calculated by the numerical controller of the present invention. In this manner, since the linear acceleration and deceleration time constant is linearly changed in accordance with the arrived speed and the bell-shaped acceleration and deceleration time constants are linearly changed in accordance with the movement amount, the problem of the boundary value of the movement amount in the function of "positioning with optimum acceleration" can be solved. Note that the speed is set at an available maximum speed in the specifications of the machine and the position gain is set at a standard value of the position gain set at initial adjustment of the machine (servo motor), each as a fixed value.

Also in the prior art technique, if the movement amount is increased only with the linear acceleration and deceleration time constant, an overshoot is increased, which poses a problem of making time until punching is enabled unstable and making control difficult. However, in the numerical controller of the present invention, a multiplication is performed by the bell-shaped acceleration and deceleration time constant within a range in which the hit rate is satisfied, thereby decreasing an overshoot amount and making control easy.

And, the numerical controller according to the present invention controls a machine which performs punch pressing based on a program, and includes a parameter setting unit which accepts settings of punch press parameters regarding punch pressing, an NC parameter calculating unit which calculates an axis control parameter in punch pressing based on the punch press parameters accepted by the parameter setting unit, a parameter storage unit which stores the punch press parameters and the axis control parameter, a command analyzing unit which reads and analyzes a command block from the program to generate movement command data and outputs the generated movement command data, an interpolating unit which performs interpolation processing based on the movement command data to generate interpolation data and outputs the generated interpolation data, an accelerating and decelerating unit which calculates a linear acceleration and deceleration time constant and a bell-shaped acceleration and deceleration time constant for use in axis control based on the punch press parameters and the axis control parameter stored in the parameter storage unit and a feed rate specified by the command block, performs post-interpolation acceleration or deceleration processing on the interpolation data based on the calculated linear acceleration and deceleration time constant and the bell-shaped acceleration and deceleration time constant, and outputs the interpolation data to which the post-interpolation acceleration or deceleration processing is applied, and a servo control unit which controls an axis of the machine based on the interpolation data outputted from the accelerating and decelerating unit, the interpolation data to which the post-interpolation acceleration or deceleration processing is applied.

In the numerical controller, the punch press parameters include at least a time taken for one punch, a reference pitch and a target hit rate associated therewith, a minimum pitch and a target hit rate associated therewith, and a maximum acceleration torque and a linear acceleration and deceleration time constant dependent on a structure of the machine.

In the numerical controller, the axis control parameter may include a torque waveform for adjusting the linear acceleration and deceleration time constant.

In the numerical controller, the accelerating and decelerating unit calculates the bell-shaped acceleration and deceleration time constant which is linear with respect to the linear acceleration and deceleration time constant.

With the present invention, only by setting four parameters including the movement amount (reference pitch) $d_p$ (mm) of the table axis movement and the target hit rate $h_p$ (times/msec) associated therewith; the movement amount (minimum pitch) $d_m$ (mm) of the table axis movement and a target hit rate $h_m$ (times/msec) associated therewith; a time $t_p$ (msec) taken for one punch; and motor characteristics of the servo motor on the table axis, the bell-shaped acceleration and deceleration time constants $t_{2p}$ and $t_{2m}$ with the reference pitch and the minimum pitch, respectively, can be automatically calculated and set. Therefore, the number of processes for item inputs by the operator can be decreased.

BRIEF DESCRIPTION OF THE DRAWINGS

The above and other objects and features of the present invention will become apparent from the following description of exemplary embodiments with reference to the accompanying drawings in which:

FIG. 3 is a diagram for depicting a relation between acceleration torque and feed rate;

FIG. 10 is a diagram for depicting the technology disclosed in Japanese Patent Application Laid-Open No. 4-335410;

FIG. 13 is a diagram depicting a linear acceleration and deceleration time constant and bell-shaped acceleration and deceleration time constants automatically calculated by the numerical controller of the present invention.

DETAILED DESCRIPTION OF THE PREFERRED EMBODIMENT

In the following, an embodiment of the present invention is described together with the drawings. First, each process in the numerical controller of the present invention is described.

<Calculation of Table Axis Operation Time t From Target Hit Rate and Press Time>

Figure 1:
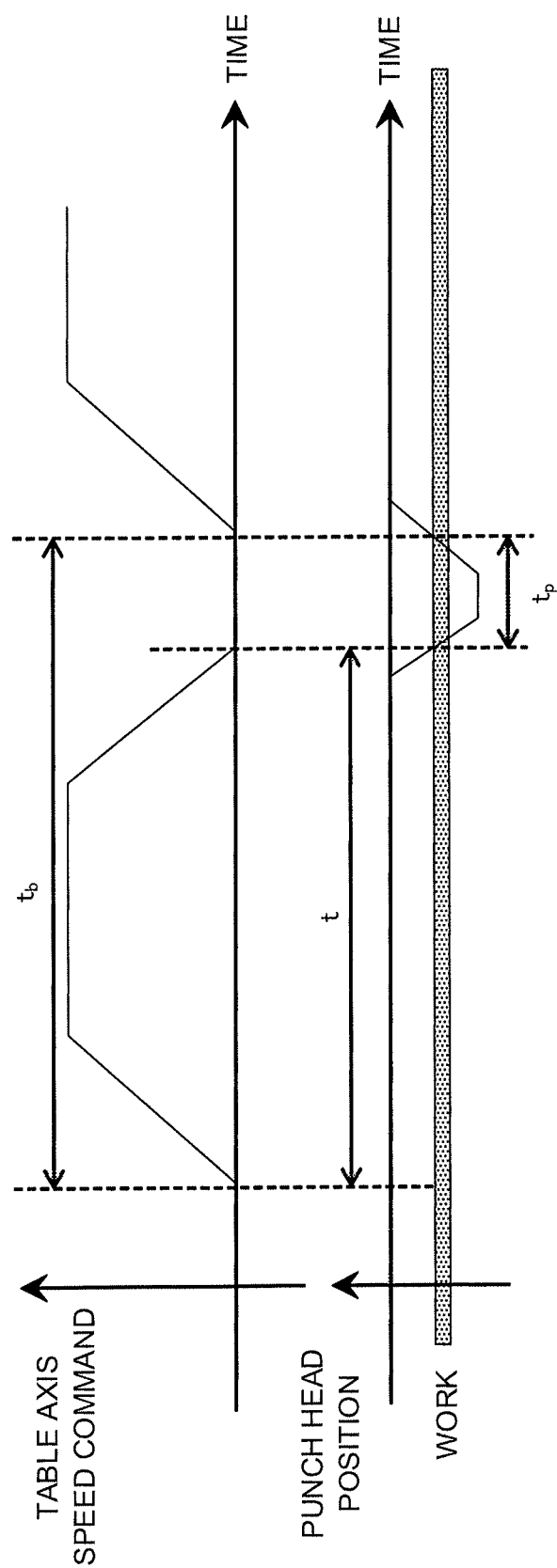
FIG. 1 is a diagram depicting a relation between parameters for used in punch press controlled by a numerical controller of the present invention.

In the numerical controller of the present invention, from target hit rates and their associated reference and minimum pitches set by a machine manufacturer, a table axis operation time t (msec) capable of achieving each target hit rate is found. The table axis operation time t (msec) per press block in a processing program capable of achieving the target hit rates can be calculated by Equation 1 below, when a target reference hit rate is h (times/msec), an execution time per press block capable of achieving the target hit rate is $t_b$ (msec), and a time taken for one punch is $t_p$ (msec), as depicted in FIG. 1.

$$t_b = \frac{1}{h}, t = t_b - t_p, \text{ therefore, } t = \frac{1}{h} - t_p \qquad \text{[Equation 1]}$$

<Relation Between Acceleration Torque and Acceleration>

A relation between acceleration torque and acceleration of a servo motor is generally represented by Equation 2 below, and a relation between rotation speed and axis delivering speed of the motor is generally represented by Equation 3 below.

$$T_a = V_m \times \frac{2\pi}{60} \times \frac{1}{t_1} \times \left(J_M + \frac{J_L}{\eta}\right) \qquad \text{[Equation 2]}$$

$T_a$: acceleration torque $(Nm)$ $V_m$: motor rotation speed at rapid feed $(\text{min}^{-1})$ $t_1$: acceleration and deceleration time constant (sec)

$J_M$: rotor's moment of inertia $(kgm^2)$ $J_L$: moment of inertia of load $(kgm^2)$ $\eta$: mechanical efficiency $$Vm = V \times \frac{1}{P \times \frac{Z_1}{Z_2}} \quad \text{[Equation 3]}$$

$V$: axis feed rate (mm/min)

$P$: ball screw pitch $\frac{Z_1}{Z_2}$: speed reduction ratio

Based on these Equations 2 and 3, the relation between acceleration torque and acceleration of the servo motor can be represented by Equation 4 below. Since the terms other than $T_a$ and $t_1$ in this Equation 4 are constant terms defined by the specifications of the machine, it can be found that table axis acceleration $V/t_1$ and the acceleration torque $T_a$ have a proportional relation.

$$Ta = V \times \frac{1}{P \times \frac{Z_1}{Z_2}} \times \frac{2\pi}{60} \times \frac{1}{t_1} \times \left(J_M + \frac{J_L}{\eta}\right) \quad \text{[Equation 4]}$$

<Registration of Feed Rate-torque Characteristics of Servo Motor>

Figure 2:
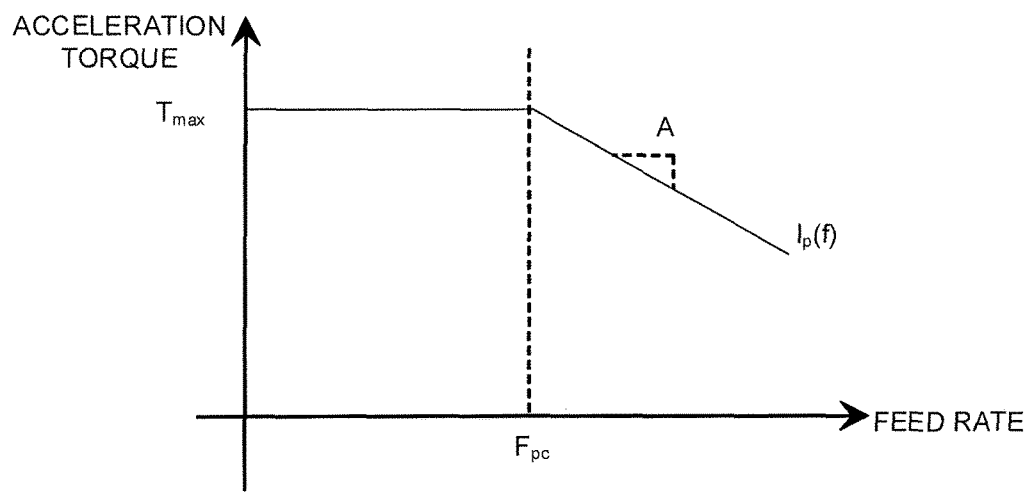
FIG. 2 is a diagram for depicting feed rate-torque characteristics of a servo motor.

The servo motor has a predetermined feed rate-torque characteristics representing the relation between feed rate and torque (refer to FIG. 2). Features of these feed rate-torque characteristics (maximum acceleration torque $T_{max}$, changing point $F_{pc}$, and gradient A from the changing point) are registered in advance on a database so as to be linked to an allocated motor number of each servo motor. With the features of the feed rate-torque characteristics registered on the database in this manner, the feed rate-torque characteristics of each servo motor can be obtained only by designating a motor number. Note that for the use of a servo motor not registered on the database, the features of the feed rate-torque characteristics (maximum acceleration torque $T_{max}$, changing point $F_{pc}$, and gradient A from the changing point) may also be directly inputted. By allowing direct inputs, it is possible to flexibly support the use of a newly introduced servo motor, a servo motor of another manufacturer, and the like.

<Calculation of Adjustment Torque Waveform for Linear Acceleration and Deceleration Time Constant>

FIG. 3 depicts feed rate-torque characteristics of the servo motor. From FIG. 3, an upper-limit torque waveform of the feed rate-torque characteristics of the servo motor used in the punch press machine can be represented by Equation 5 below.

$$\begin{cases} l_p(f) = T_{max} & f < F_{pc} \\ l_p(f) = Af + (T_{max} - AF_{pc}) & f \geq F_{pc} \end{cases} \quad \text{[Equation 5]}$$
(A: gradient)

And, by using Equation 5 above and the maximum offset load torque (maximum acceleration torque) $T_a$ (Nm) determined from the structure of the machine, an adjustment torque waveform $l(f)$ for linearly controlling the linear acceleration and deceleration time constant and a changing point $F_c$ (mm/min) of the waveform can be represented by Equations 6 and 7 below. Note that the adjustment torque waveform $l(f)$ is found from $T_a$, the gradient A from the changing point $F_{pc}$ (mm/min) of $l_p(f)$, and a ratio X (%) with respect to the upper-limit torque waveform (this parameter is to prevent saturation of torque at the changing point $F_c$ onward).

$$\begin{cases} l(f) = T_a & \text{when the feed rate } f \text{ is equal to or smaller than } F_c \\ l(f) = Af + \frac{X}{100}(T_{max} - AF_{pc}) & \text{when the feed rate } f \text{ is larger than } F_c \end{cases} \quad \text{[Equation 6]}$$

$$F_c = \frac{T_a - \frac{X}{100}(T_{max} - AF_{pc})}{A} \quad \text{[Equation 7]}$$

<Calculation of Linear Acceleration and Deceleration Time Constant>

The maximum toque $T_a$ at acceleration and deceleration and a maximum acceleration (linear acceleration and deceleration time constant $t_{1m}$) are depend on the structure of the machine. However, since the upper-limit torque is decreased from the changing point $F_c$ of the adjustment torque waveform $l(f)$, the linear acceleration and deceleration time constant has to be increased so that torque is not saturated. The linear acceleration and deceleration time constant $t_1$ can be found by Equation 8 below, from the maximum torque $T_a$, the adjustment torque waveform $l(f)$, and the ratio X with respect to the upper-limit torque.

$$\begin{cases} t_1 = t_{1m} & \text{when the feed rate } f \text{ is equal to or smaller than } F_c \\ t_1 = \frac{T_a}{l(f)} t_{1m} & \text{when the feed rate } f \text{ is larger than } F_c \end{cases} \quad \text{[Equation 8]}$$

<Calculation of Bell-shaped Acceleration and Deceleration Time Constants>

Figure 4:
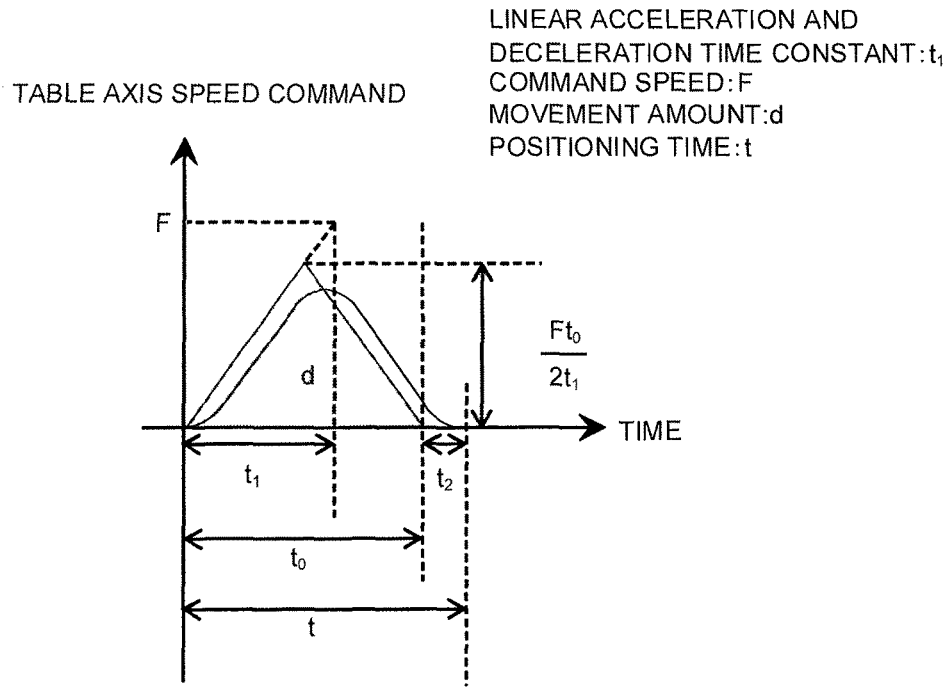
FIG. 4 is a diagram for depicting calculation of a bell-shaped acceleration and deceleration time constant when a movement amount is small and a table axis arrived speed is short of a command speed.

Bell-shaped acceleration and deceleration time constants $t_{2p}$ and $t_{2m}$ are calculated from the above-calculated linear acceleration and deceleration time constant $t_1$, the maximum allowable operation time t, and arrived speed. As depicted in FIG. 4, when a movement amount d is small and the table axis arrived speed is short of a command speed F, a bell-shaped acceleration and deceleration time constant $t_2$ can be found as follows. That is, from FIG. 4, $d=t_0/2 \times F t_0/2 t_1$ holds. Therefore, when this equation is solved for a positioning time to only with the linear acceleration and deceleration time constant, $t_0 = \sqrt{(4dt_1/F)}$ is obtained. Also, from $t = t_0 + t_2$, $t = \sqrt{(4dt_1/F)} + t_2$ is obtained. When this equation is solved for $t_2$, $t_2 = t - \sqrt{(4dt_1/F)}$ is obtained, and therefore a bell-shaped acceleration and deceleration time constant with a reference pitch and a minimum pitch can be represented by Equation 9 below. Therefore, $t_{2p}$ and $t_{2m}$ can be calculated by Equation 10 below.

$$t_2 = t - \sqrt{\frac{4dt_1}{F}} \quad \text{[Equation 9]}$$

$$t_{2p} = t - \sqrt{\frac{4d_p t_1}{F}} \quad \text{[Equation 10]}$$

$$t_{2m} = t - \sqrt{\frac{4d_m t_1}{F}}$$

Figure 5:
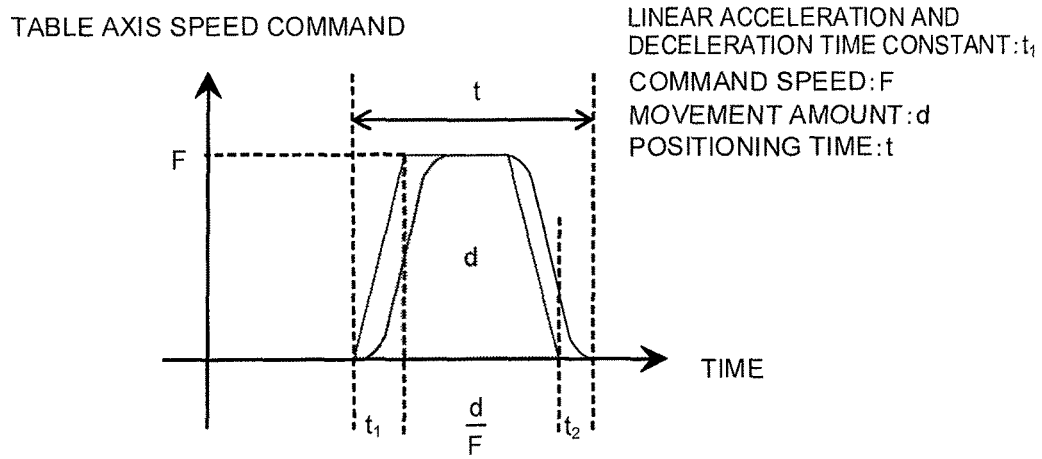
FIG. 5 is a diagram for depicting calculation of a bell-shaped acceleration and deceleration time constant when the movement amount is large and the table axis arrived speed is a command speed.

Also, the bell-shaped acceleration and deceleration time constants $t_{2p}$ and $t_{2m}$ are calculated based on the above-described linear acceleration and deceleration time constant $t_1$, maximum movable time t, and arrived speed. As depicted in FIG. 5, when the movement amount d is sufficiently large and the table axis arrived speed is the command speed F, the bell-shaped acceleration and deceleration time constant $t_2$ can be represented by Equation 11 below. Therefore, $t_{2p}$ and $t_{2m}$ can be calculated by Equation 12 below.

$$t_2 = t - \frac{d}{F} - t_1 \quad [\text{Equation 11}]$$

$$t_{2p} = t - \frac{d_p}{F} - t_1 \quad [\text{Equation 12}]$$

$$t_{2m} = t - \frac{d_m}{F} - t_1$$

Then, with reference to the bell-shaped acceleration and deceleration time constants $t_{2p}$ and $t_{2m}$ with a table axis movement amount being the reference pitch $d_p$ and the minimum pitch $d_m$, the bell-shaped acceleration and deceleration time constant is switched to the linear one in accordance with the table axis movement amount. An acceleration and deceleration time constant $t_{2d}$ (msec) with the movement amount d (mm) is calculated by Equation 13 below.

$$\begin{cases} t_{2d} = t_{2m} & (\text{when } d < d_m) \\ t_{2d} = \frac{t_{2p} - t_{2m}}{d_p - d_m} d & (\text{when } d_m \le d \le d_p) \\ t_{2d} = t_{2p} & (\text{when } d_p < d) \end{cases} \quad [\text{Equation 13}]$$

In the numerical controller of the present invention, the linear acceleration and deceleration time constant $t_1$ and the bell-shaped acceleration and deceleration time constant $t_{2d}$ are calculated through the above operation process, and by using these values, table axis movement control is performed.

Figure 6:
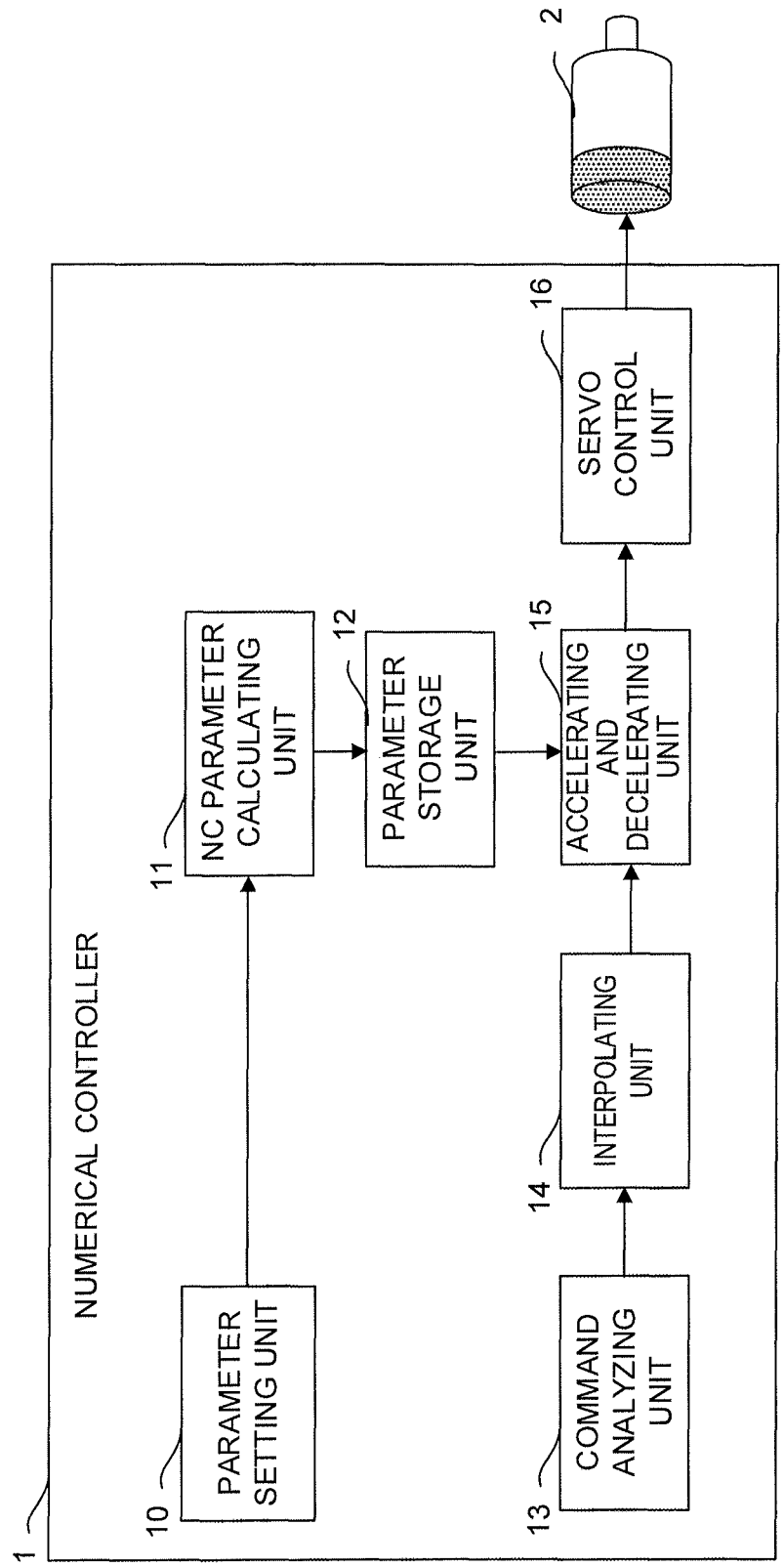
FIG. 6 is a functional block diagram of a numerical controller according to an embodiment of the present invention.

FIG. 6 is a functional block diagram of the numerical controller according to an embodiment of the present invention. A numerical controller 1 of the present embodiment includes a parameter setting unit 10, an NC parameter calculating unit 11, a parameter storage unit 12, a command analyzing unit 13, an interpolating unit 14, an accelerating and decelerating unit 15, and a servo control unit 16.

The parameter setting unit 10 accepts settings of various parameters for use in processing by a punch press inputted based on operator's operation from a display/MDI unit (not depicted) included in the numerical controller 1. Examples of various parameters of the punch press include the time $t_p$ taken for one punch, the reference pitch $d_p$ and the target hit rate $h_p$ associated therewith, the minimum pitch $d_m$ and the target hit rate $h_m$ associated therewith, and the maximum acceleration torque $T_a$ and the linear acceleration and deceleration time constant $t_{1m}$ dependent on the structure of the machine.

Also, the parameter setting unit 10 accepts, as required, settings of the feed rate-torque characteristics of the servo motor based on the operator's operation.

Based on the settings of the various parameters for use in processing by the punch press set by the parameter setting unit 10, the NC parameter calculating unit 11 calculates the adjustment torque waveform l(f) for the linear acceleration and deceleration time constant by following the above-described calculation procedure, and stores, in the parameter storage unit 12, the calculated adjustment torque waveform l(f) for the linear acceleration and deceleration time constant together with the various parameters set by the parameter setting unit 10.

The command analyzing unit 13 analyzes a block of a process command included in a program read from memory not depicted to generate data regarding a movement command, and outputs the generated data regarding the movement command to the interpolating unit 14.

Based on the data regarding the movement command input from the command analyzing unit 13, the interpolating unit 14 generates interpolation data obtained by interpolation calculation of points on a command route specified by the data regarding the movement command at an interpolation cycle, and outputs the generated interpolation data and an arrived speed included in the data regarding the movement command to the accelerating and decelerating unit 15.

Based on the arrived speed input from the interpolating unit 14, the various parameters stored in the parameter storage unit 12, and the adjustment torque waveform l(f) for the linear acceleration and deceleration time constant, the accelerating and decelerating unit 15 calculates the linear acceleration and deceleration time constant $t_1$ and the bell-shaped acceleration and deceleration time constants $t_{2p}$ and $t_{2m}$, and further calculates the bell-shaped acceleration and deceleration time constant $t_{2d}$. Then, based on the calculated linear acceleration and deceleration time constant $t_1$ and the bell-shaped acceleration and deceleration time constant $t_{2d}$, the accelerating and decelerating unit 15 performs post-interpolation acceleration or deceleration processing on the interpolation data input from the interpolating unit 14 to calculate a speed for each drive axis at every interpolation cycle, and outputs, to the servo control unit 16, interpolation data after acceleration or deceleration processing to which the calculation result is applied.

Then, based on the output from the accelerating and decelerating unit 15, the servo control unit 16 controls the servo motor 2 which controls each axis to be controlled.

Figure 7:
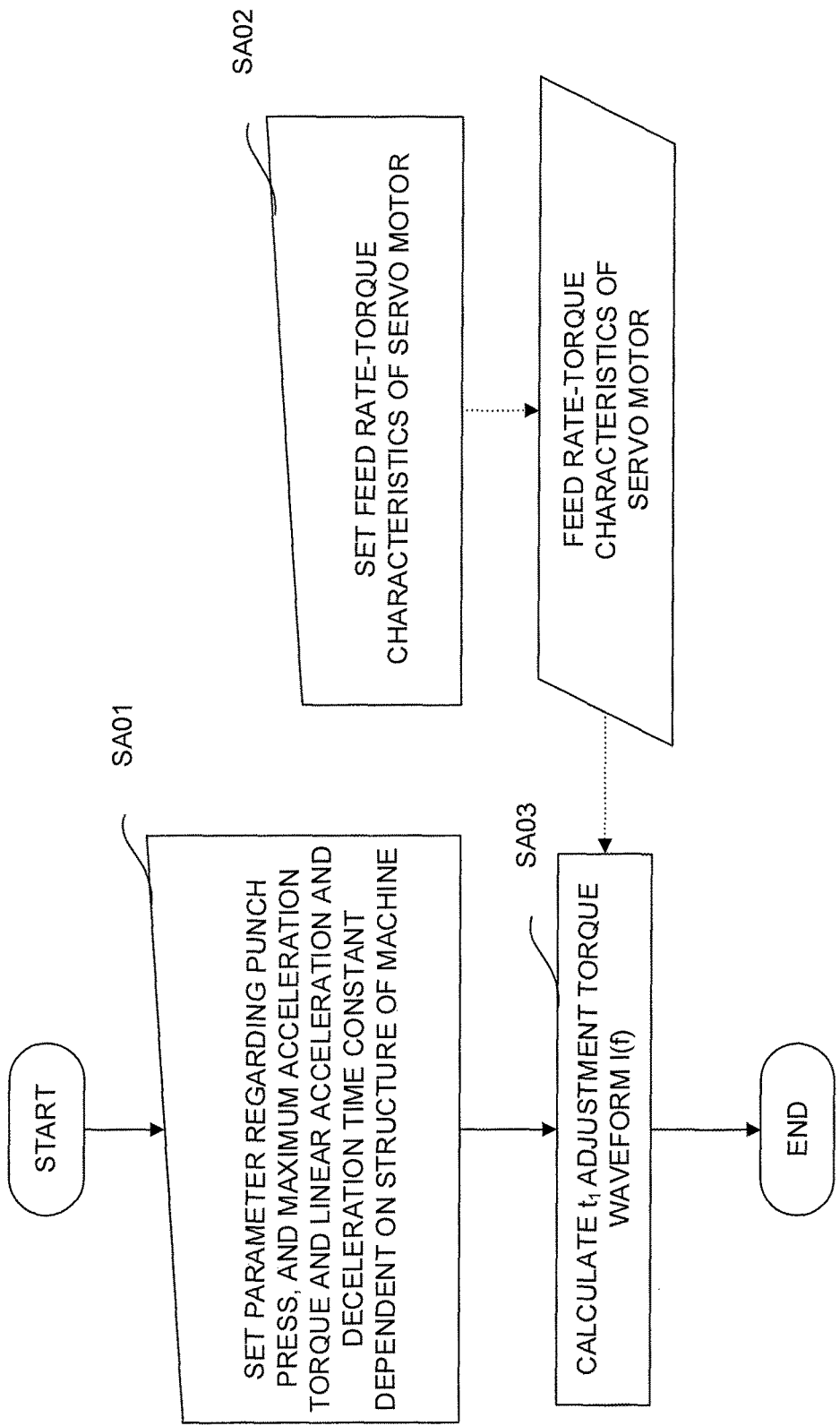
FIG. 7 is a flowchart of processing regarding parameter settings to be performed on the numerical controller of FIG. 6.

FIG. 7 is a flowchart of processing regarding parameter settings to be performed on the numerical controller 1 of the present invention.

[Step SA01] The parameter setting unit 10 accepts various parameters, by operator's operation, for use in processing by a punch press such as the time $t_p$ taken for one punch, the reference pitch $d_p$ and the target hit rate $h_p$ associated therewith, and the minimum pitch $d_m$ and the target hit rate $h_m$ associated therewith, and settings such as the maximum acceleration torque $T_a$ and the linear acceleration and deceleration time constant $t_{1m}$ dependent on the structure of the machine, and then outputs these parameters and settings to the NC parameter calculating unit 11.

[Step SA02] The parameter setting unit 10 accepts, as required, settings of the feed rate-torque characteristics of the servo motor by operator's operation, and outputs the settings to the NC parameter calculating unit 11.

[Step SA03] The NC parameter calculating unit 11 calculates the adjustment torque waveform l(f) for the linear acceleration and deceleration time constant based on the various setting values set by the operator at steps SA01 and SA02, and stores the calculated adjustment torque waveform l(f) for the linear acceleration and deceleration time constant in the parameter storage unit 12 together with the various setting values set at steps SA01 and SA02.

Figure 8:
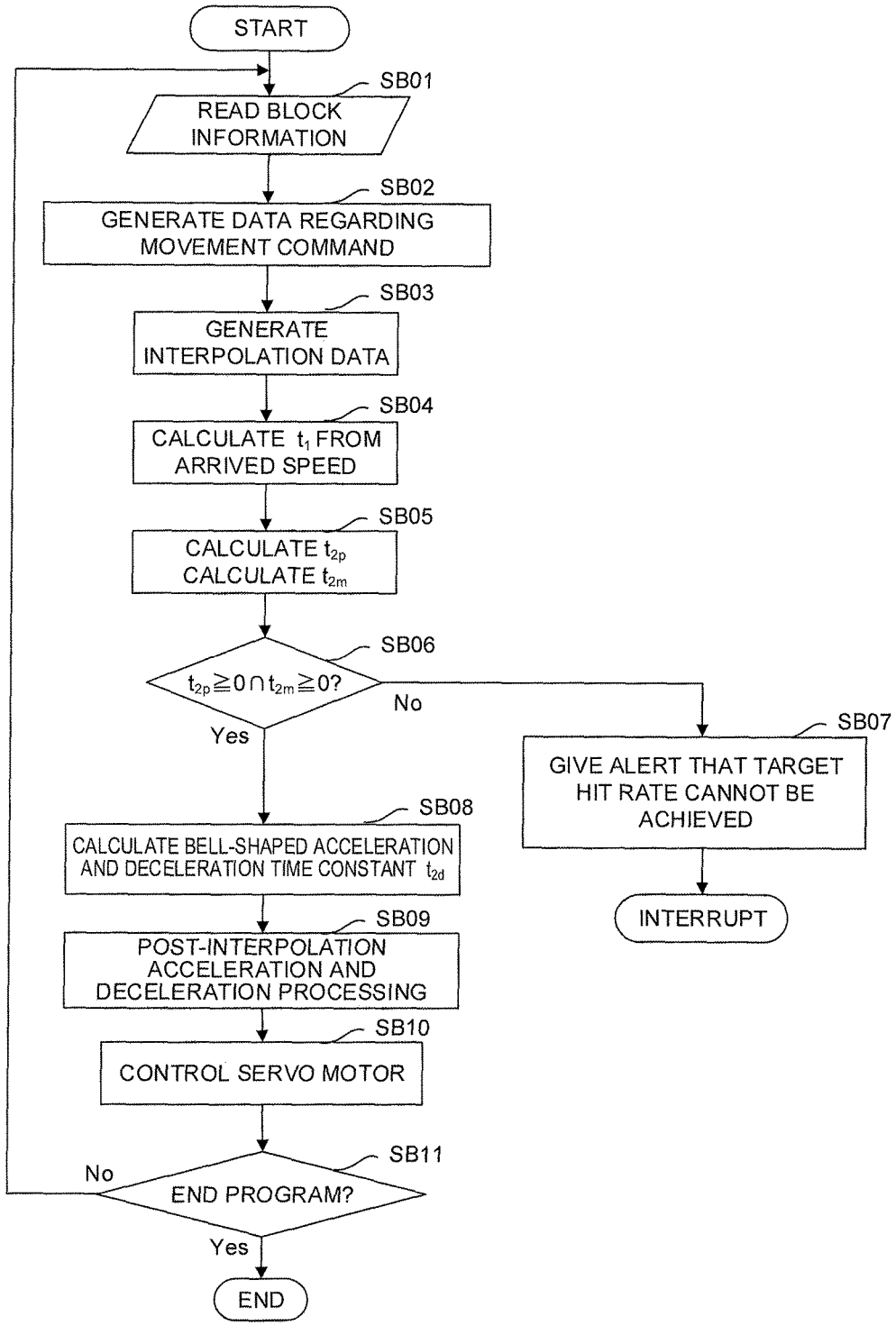
FIG. 8 is a flowchart of control processing at the time of punch pressing to be performed on the numerical controller of FIG. 6.
Figure 9:
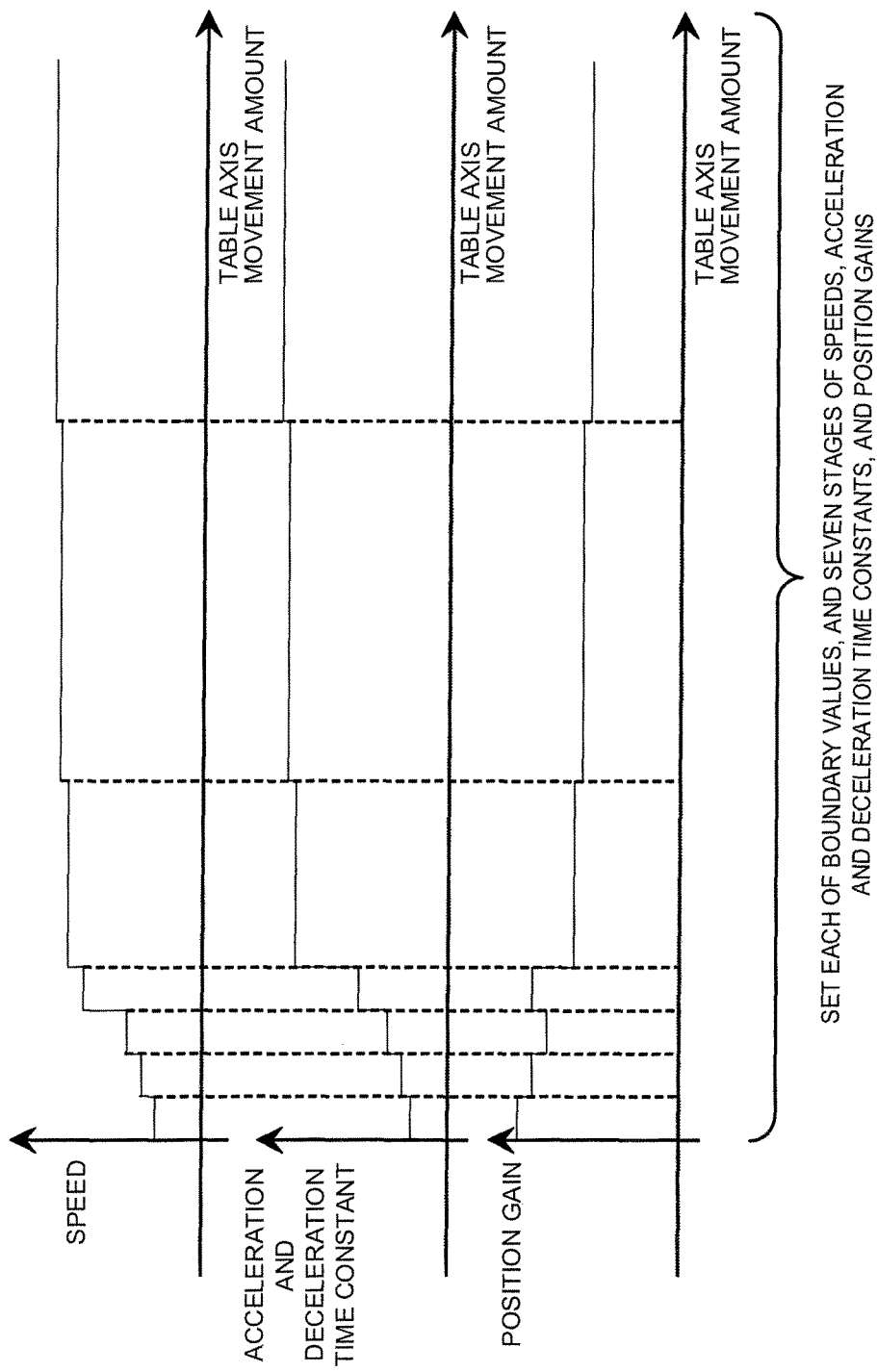
FIG. 9 is a diagram for depicting settings of speed, acceleration and deceleration time constant, and position gain achieved by "positioning with optimum acceleration" in punch pressing in a prior art technique.
Figure 11:
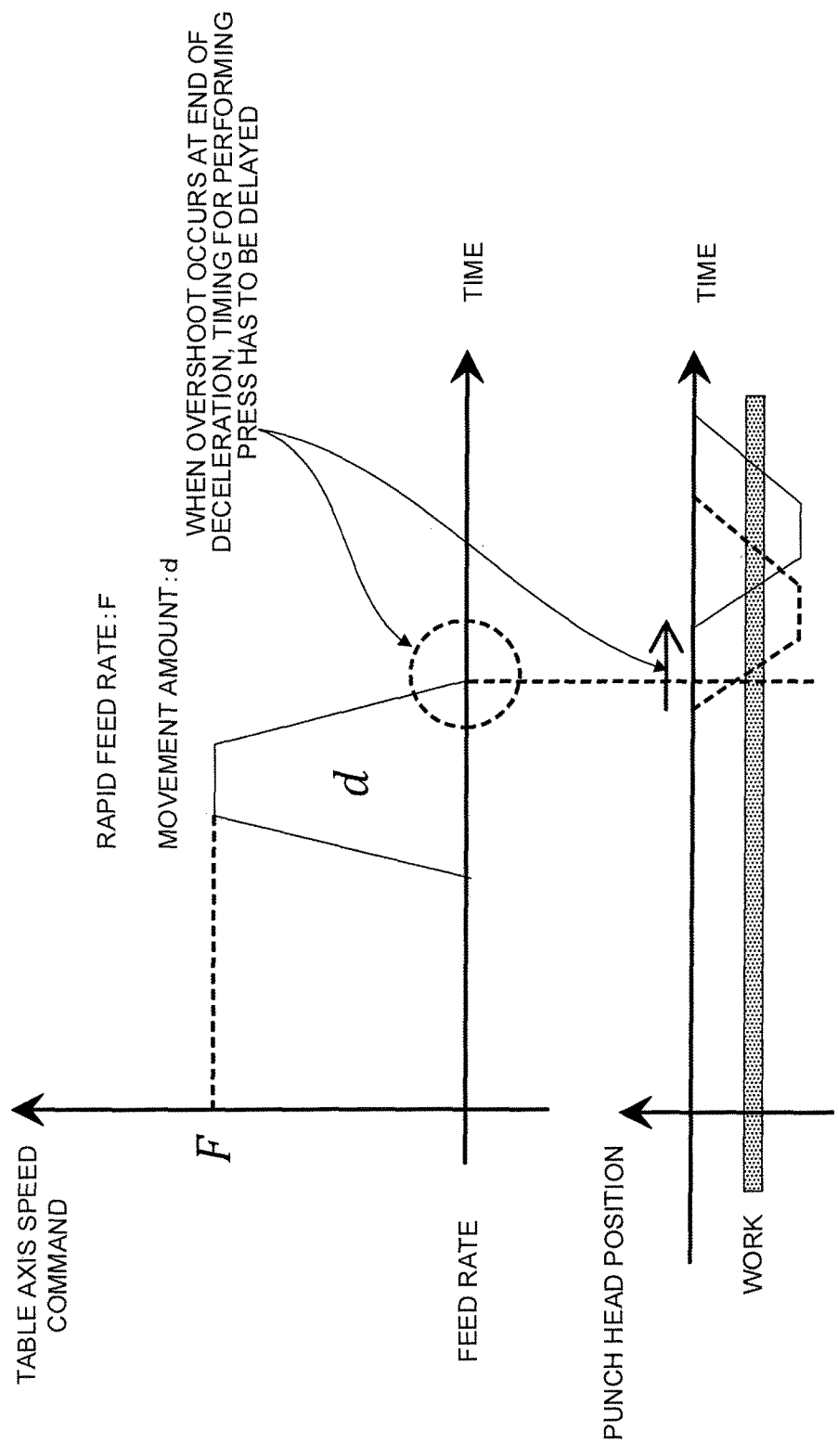
FIG. 11 is a diagram for depicting a problem raised upon applied the technology of Japanese Patent Application Laid-Open No. 4-335410 to punch pressing.
Figure 12:
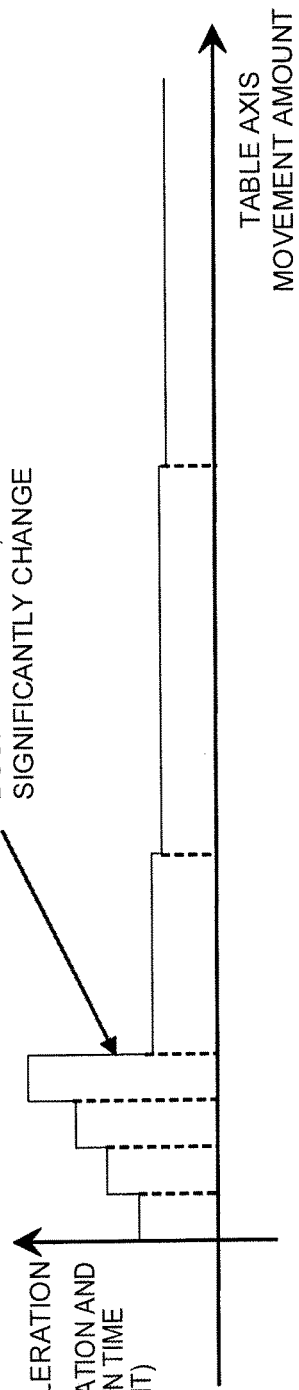
FIG. 12 is a diagram for depicting a problem when "positioning with optimum acceleration" in punch pressing in the prior art technique is used.

FIG. 8 is a flowchart of a control process effected at the time of punch pressing to be performed on the numerical controller 1 of the present invention.

[Step SB01] The command analyzing unit 13 reads a block from a program stored in memory not depicted.

[Step SB02] The command analyzing unit 13 analyzes the block read at step SB01 to generate data regarding a movement command, and outputs the generated data regarding the movement command to the interpolating unit 14.

[Step SB03] The interpolating unit 14 performs interpolation processing on the data regarding the movement command generated at step SB02 to generate interpolation data, and outputs the generated interpolation data and a feed rate (arrived speed) specified by the data regarding the movement command to the accelerating and decelerating unit 15.

[Step SB04] The accelerating and decelerating unit 15 calculates the linear acceleration and deceleration time constant $t_1$ based on the arrived speed input from the interpolating unit 14, the various parameters stored in the parameter storage unit 12, and the adjustment torque waveform l(f) for the linear acceleration and deceleration time constant.

[Step SB05] The accelerating and decelerating unit 15 calculates the bell-shaped acceleration and deceleration time constants $t_{2p}$ and $t_{2m}$ based on the linear acceleration and deceleration time constant $t_1$ calculated at step SB04 and the various parameters stored in the parameter storage unit 12.

[Step SB06] The accelerating and decelerating unit 15 determines whether the bell-shaped acceleration and deceleration time constants $t_{2p}$ and $t_{2m}$ calculated at step SB05 are both equal to or larger than 0. When both are equal to or larger than 0, the procedure proceeds to step SB08. When either one of them is smaller than 0, the procedure proceeds to step SB07.

[Step SB07] The accelerating and decelerating unit 15 outputs an alert that a target hit rate cannot be achieved, and interrupts the processing.

[Step SB08] The accelerating and decelerating unit 15 calculates the bell-shaped acceleration and deceleration time constants $t_{2d}$ based on the bell-shaped acceleration and deceleration time constants $t_{2p}$ and $t_{2m}$ calculated at step SB05 and the various parameters stored in the parameter storage unit 12.

[Step SB09] The accelerating and decelerating unit 15 performs post-interpolation acceleration or deceleration processing on the interpolation data input from the interpolating unit 14 based on the linear acceleration and deceleration time constant $t_1$ calculated at step SB04 and the bell-shaped acceleration and deceleration time constant $t_{2d}$ calculated at step SB08, and outputs the processing result to the servo control unit 16.

[Step SB10] The servo control unit 16 controls the servo motor 2 which controls each axis to be controlled, based on the output from the accelerating and decelerating unit 15.

[Step SB11] Whether the program has ended is determined. If the program has ended, the processing ends. If the program has not ended, the procedure proceeds to step SB01.

While the embodiment of the present invention has been described above, the present invention is not restricted to the examples of the above-described embodiment, and can be implemented by other embodiments by adding modifications as appropriate.

The invention claimed is:

1. A numerical controller for controlling a machine which performs punch pressing based on a program, the numerical controller comprising a processor configured to:
   accept settings of punch press parameters regarding punch pressing;
   calculate an axis control parameter in punch pressing based on the accepted punch press parameters;
   store the punch press parameters and the axis control parameter;
   read and analyze a command block from the program to generate movement command data and output the generated movement command data;
   perform interpolation processing based on the movement command data to generate interpolation data and output the generated interpolation data;
   calculate a linear acceleration and deceleration time constant and a bell-shaped acceleration and deceleration time constant for use in axis control based on the stored punch press parameters and the axis control parameter and a feed rate specified by the command block, perform post-interpolation acceleration or deceleration processing on the interpolation data based on the calculated linear acceleration and deceleration time constant and the bell-shaped acceleration and deceleration time constant, and output the processed interpolation data to which the post-interpolation acceleration or deceleration processing is applied; and
   control an axis of the machine based on the outputted processed interpolation data, the processed interpolation data to which the post-interpolation acceleration or deceleration processing is applied.

2. The numerical controller according to claim 1, wherein the punch press parameters include at least a time taken for one punch, a reference pitch and a first target hit rate associated therewith, a minimum pitch and a second target hit rate associated therewith, and a maximum acceleration torque and a linear acceleration and deceleration time constant dependent on a structure of the machine.

3. The numerical controller according to claim 1, wherein the axis control parameter includes at least a torque waveform for adjusting the linear acceleration and deceleration time constant.

4. The numerical controller according to claim 1, wherein the processor is further configured to calculate the bell-shaped acceleration and deceleration time constant which is linear with respect to the linear acceleration and deceleration time constant.

* * * * *